(12) United States Patent
Takemoto et al.

(10) Patent No.: US 9,174,340 B2
(45) Date of Patent: Nov. 3, 2015

(54) ROBOT SYSTEM

(71) Applicant: KABUSHIKI KAISHA YASKAWA DENKI, Kitakyushu-shi (JP)

(72) Inventors: Fumihiko Takemoto, Fukuoka (JP); Keita Ogoh, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 135 days.

(21) Appl. No.: 13/832,500

(22) Filed: Mar. 15, 2013

(65) Prior Publication Data

US 2014/0214201 A1 Jul. 31, 2014

(30) Foreign Application Priority Data

Jan. 28, 2013 (JP) ................... 2013-013258

(51) Int. Cl.
  *B25J 9/16* (2006.01)
(52) U.S. Cl.
  CPC ............. *B25J 9/161* (2013.01); *B25J 9/1674* (2013.01)
(58) Field of Classification Search
  CPC .............. B25J 9/16; B25J 19/06; B25J 9/161; B25J 9/1674; G05B 19/048; G05B 19/0428
  USPC ........................................ 700/245
  See application file for complete search history.

(56) References Cited

U.S. PATENT DOCUMENTS

| | | | | |
|---|---|---|---|---|
| 7,540,214 B2* | 6/2009 | Iwai et al. | | 74/490.02 |
| 7,610,119 B2 | 10/2009 | Abe et al. | | |
| 7,656,629 B2* | 2/2010 | Pullmann et al. | | 361/62 |
| 8,072,889 B2* | 12/2011 | Kato et al. | | 370/241 |
| 8,917,793 B2* | 12/2014 | Mori | | 375/288 |
| 2005/0063114 A1* | 3/2005 | Suhara et al. | | 361/62 |
| 2006/0202556 A1* | 9/2006 | Tanaka et al. | | 307/11 |
| 2007/0105070 A1* | 5/2007 | Trawick | | 434/11 |
| 2008/0260510 A1* | 10/2008 | Iwai et al. | | 414/787 |
| 2011/0010006 A1* | 1/2011 | Tani et al. | | 700/245 |

(Continued)

FOREIGN PATENT DOCUMENTS

| | | |
|---|---|---|
| JP | 2004-330346 | 11/2004 |
| JP | 4196757 | 2/2005 |

(Continued)

OTHER PUBLICATIONS

Japanese Office Action for corresponding JP Application No. 2013-013258, Jan. 21, 2014.

(Continued)

*Primary Examiner* — Jerrah Edwards
*Assistant Examiner* — Tamara Weber
(74) *Attorney, Agent, or Firm* — Mori & Ward, LLP (57) ABSTRACT

A robot system according to an aspect of embodiments includes a terminal part, a robot control unit, and a duplex signal line. The terminal part includes a connection terminal to which one or more external devices that output a plurality of signals can be connected. The robot control unit controls an operation of the robot in accordance with the signals from the external device(s). The duplex signal line connects the terminal part to the robot control unit and transmits the plurality of signals, input from the external device(s) into the terminal part, to the robot control unit via two routes. Moreover, the duplex signal line includes the two routes each of which collects the plurality of signals and transmits the signals with a signal line.

16 Claims, 5 Drawing Sheets

(56) References Cited

U.S. PATENT DOCUMENTS

| | | | |
|---|---|---|---|
| 2011/0160910 A1* | 6/2011 | Preisinger et al. | 700/275 |
| 2011/0191814 A1* | 8/2011 | Kobayashi | 725/127 |
| 2012/0303160 A1* | 11/2012 | Ziegler et al. | 700/259 |
| 2012/0307679 A1* | 12/2012 | Balasubramanian | 370/254 |

FOREIGN PATENT DOCUMENTS

| | | |
|---|---|---|
| JP | 2007-288257 | 11/2007 |
| JP | 2010-147990 | 7/2010 |
| JP | 2010-167550 | 8/2010 |
| JP | 2011-194480 | 10/2011 |
| JP | 2013-013967 | 1/2013 |

OTHER PUBLICATIONS

Japanese Office Action for corresponding JP Application No. 2013-013258, Apr. 15, 2014.

Chinese Office Action for corresponding CN Application No. 201310186363.4, Jun. 18, 2015.

* cited by examiner

ROBOT SYSTEM

CROSS-REFERENCE TO RELATED APPLICATION

This application is based upon and claims the benefit of priority from the prior Japanese Patent Application No. 2013-013258, filed on Jan. 28, 2013, the entire contents of which are incorporated by reference.

FIELD

The embodiments discussed herein are directed to a robot system.

BACKGROUND

There has been proposed a conventional robot system that stops a behavior of a robot to ensure security around the robot when an external device such as an emergency stop switch is handled and a signal is input from the external device. This robot system has been known as disclosed in, for example, Japanese Patent No. 4196757.

The above robot system is configured to duplex signal lines for connecting external devices to a robot control unit that controls a behavior of a robot so as to surely input the signal from the external device into the robot control unit even if one of the signal lines has a trouble such as breaking of wire. As the signal line, there is widely known a so-called hard-wired signal line that transmits one signal by using one dedicated signal line.

In recent years, the type of external devices or the number of signals from the external devices tend to increase. Therefore, when two routes are configured in a hard-wired manner in the above duplex signal lines, the number of signal lines increases by two if the number of signals from the external devices increments by one, for example. It is concerned that connectors and a terminal part that bundle signal lines become larger and thus a space required for wiring increases, and this leads to totally grow the robot system in size, as the number of signal lines increases more as described above.

SUMMARY

A robot system according to an aspect of embodiments includes a terminal part, a robot control unit, and a duplex signal line. The terminal part includes a connection terminal to which one or more external devices that output a plurality of signals can be connected. The robot control unit controls an operation of the robot in accordance with the signals from the external device(s). The duplex signal line connects the terminal part to the robot control unit and transmits the plurality of signals, input from the external device(s) into the terminal part, to the robot control unit via two routes. Moreover, the duplex signal line includes the two routes each of which collects the plurality of signals and transmits the signals with a signal line.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

First, a first embodiment will be explained.

Figure 1:
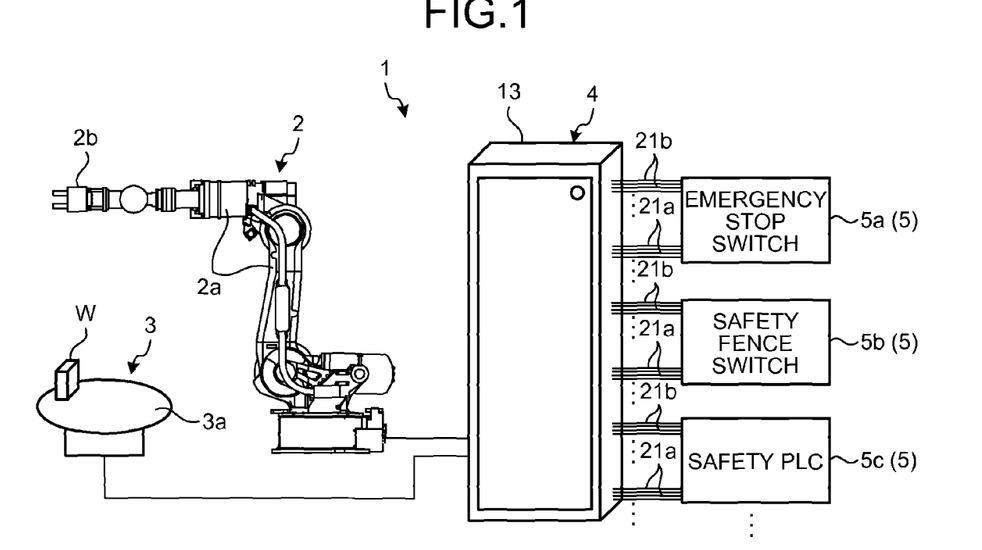
FIG. 1 is a general schematic diagram illustrating a robot system according to a first embodiment.

FIG. 1 is a general schematic diagram illustrating a robot system 1 according to the first embodiment. As illustrated in FIG. 1, the robot system 1 according to the present embodiment includes a robot 2, a peripheral device 3 of the robot 2, a control board 4, and external devices 5 such as an emergency stop switch 5a, a safety fence switch 5b, and a safety PLC (programmable logic controller) 5c.

The robot 2 is an industrial robot, for example. More specifically, the robot 2 is a multi-joint robot that has a plurality of joint axes. The robot 2 includes a plurality of arms 2a, a hand 2b that is attached to the leading end of the arm 2a, and a plurality of motors (not illustrated) for the robot that drive the joints and the hand 2b. The robot 2 controls the postures of the arms 2a and the hand 2b by using rotational drives of the motors for the robot to perform predetermined operations such as gripping and carry of a workpiece W via the hand 2b, for example.

Figure 3:
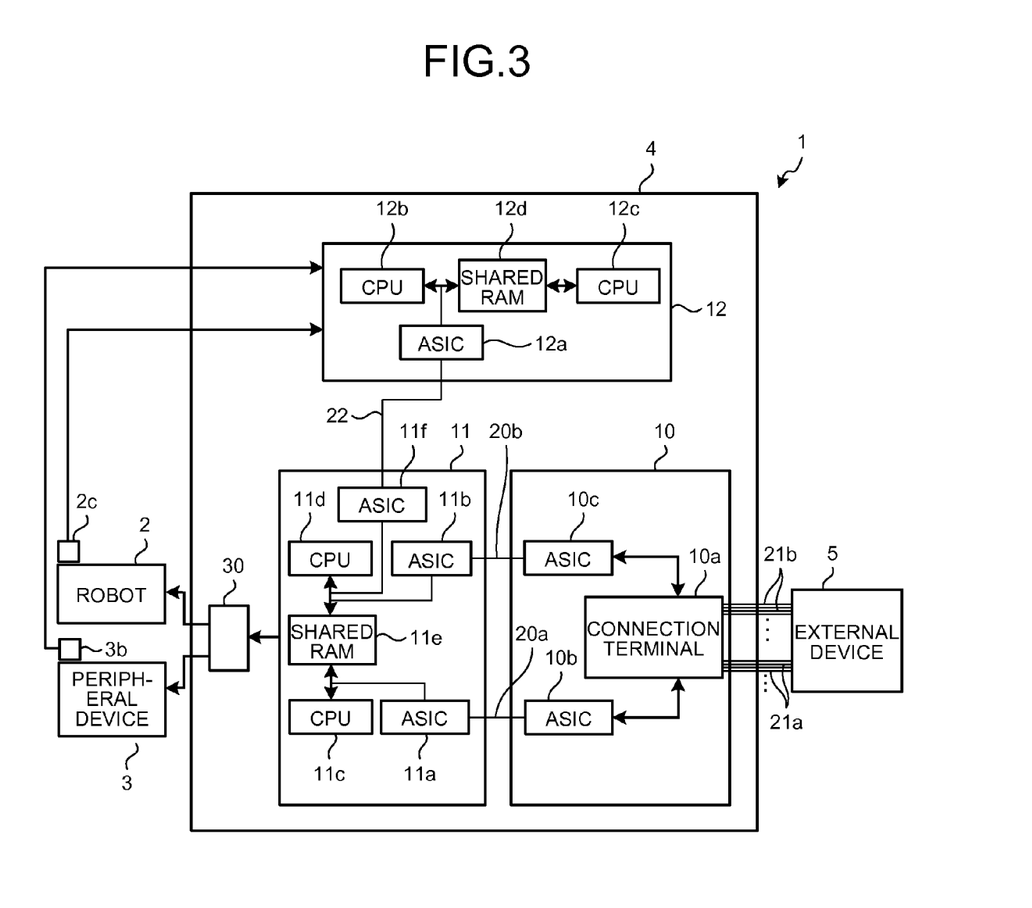
FIG. 3 is a block diagram illustrating the configuration of the robot system illustrated in FIG. 1.

Although it is not illustrated in FIG. 1, an encoder 2c (FIG. 3 schematically illustrates collectively encoders) is attached to each motor for the robot. The encoder 2c outputs, to the control board 4, signals (hereinafter, "robot encoder signals") that indicate a rotation amount and a rotation angle of the motor for the robot.

The robot 2 is not limited to the multi-joint robot. The robot 2 may be a robot whose type is different from the multi-joint robot. For example, the robot 2 may be an orthogonal robot or a parallel link robot. It has been explained that the robot 2 includes the hand 2b as an end effector. The robot 2 may include another end effector if the robot can perform a predetermined operation on the workpiece W. For example, the robot 2 may include an adsorption unit that adsorbs the workpiece W to hold it. Moreover, the robot 2 may perform welding on the workpiece W by attaching thereto an arc welding torch or a spot welding gun in place of the hand 2b.

The peripheral device 3 includes, for example, a turn table that is provided in the vicinity of the robot 2. The peripheral device 3 includes a table 3a on which the workpiece W is placed and one or more motors (not illustrated) for the peripheral device that are connected to the table 3a. The peripheral device 3 rotates the table 3a by using the rotational drive of the motor(s) for the peripheral device and changes the direction of the workpiece W in a direction in which the robot 2 is easy to perform a predetermined operation. More specifically, the motor for the peripheral device and the motor for the robot are servo motors. However, they are not limited to the servo motor. They may be motors such as hydraulic motors.

Although it is not illustrated in FIG. 1, an encoder 3b (illustrated in FIG. 3) is attached to the motor for the peripheral device. The encoder 3b outputs, to the control board 4, signals (hereinafter, "peripheral device encoder signals") that indicate a rotation amount or a rotation angle of the motor for the peripheral device.

In the present embodiment, it has been explained that the peripheral device 3 includes a turn table. However, the embodiment is not limited to this. For example, the peripheral device 3 may be a travel device that mounts thereon the robot 2 to move it in a horizontal direction or a carrier device (a belt conveyor, for example) that carries the workpiece W.

Figure 2:
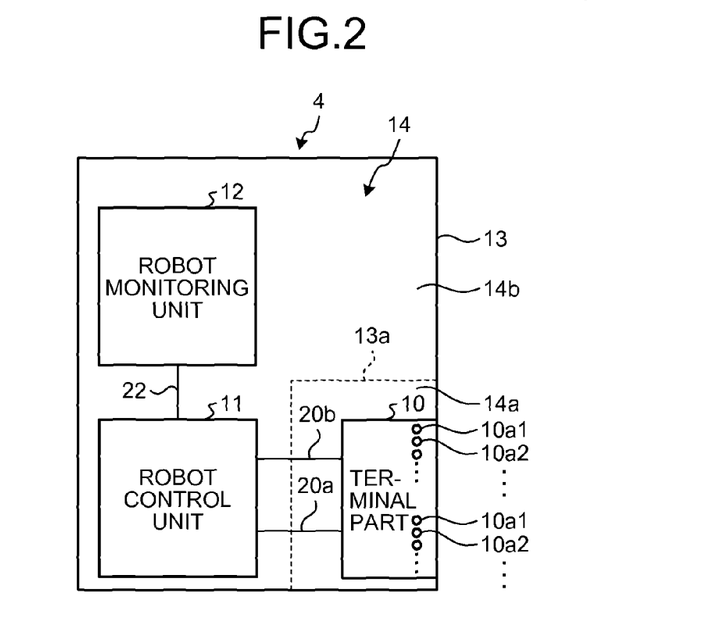
FIG. 2 is a block diagram illustrating the configuration of a control board illustrated in FIG. 1.

FIG. 2 is a block diagram illustrating the configuration of the control board 4. As illustrated in FIG. 2, the control board 4 includes a terminal part 10, a robot control unit 11, a robot monitoring unit 12, and a case 13 that houses the terminal part 10, the robot control unit 11, the robot monitoring unit 12, and the like.

The terminal part 10 includes a terminal block that has a plurality of connection terminals 10a1 and 10a2 that can be connected to the external devices 5. Among the plurality of connection terminals 10a1 and 10a2, the connection terminal indicated by the reference number 10a1 is an input terminal that inputs a signal from the external device 5, and the connection terminal indicated by the reference number 10a2 is an output terminal that outputs a signal to the external device 5. Moreover, because a signal line that connects the external device 5 and the terminal part 10 is duplexed as described later, the terminal part 10 is configured to provide the two connection terminals 10a1 that input the same signal and the two connection terminals 10a2 that output the same signal. As described above, the terminal part 10 is a means for receiving a plurality of signals.

The robot control unit 11 controls the rotational drives of the motors for the robot and the motor(s) for the peripheral device by reading the robot encoder signals and the peripheral device encoder signals so as to activate the robot 2 and the peripheral device 3 and perform a predetermined operation. However, in the present embodiment, their descriptions on the above functions of the robot control unit 11 are omitted. The robot control unit 11 further controls operations of the robot 2 and the peripheral device 3 in accordance with the signals input from the external devices 5 via the terminal part 10. Moreover, the robot monitoring unit 12 monitors operating states of the robot 2 and the peripheral device 3. The terminal part 10, the robot control unit 11, and the robot monitoring unit 12 will be explained in detail later.

The terminal part 10, the robot control unit 11, and the robot monitoring unit 12 described above are configured by, for example, circuit boards, or the like, and the circuit boards are connected to each other via signal lines. More specifically, the external devices 5 and the terminal part 10, the terminal part 10 and the robot control unit 11, and the robot control unit 11 and the robot monitoring unit 12 are connected to each other to freely communicate via the signal lines. Moreover, among the signal lines described above, the signal line between the external devices 5 and the terminal part 10 and the signal line between the terminal part 10 and the robot control unit 11 are duplexed to surely transmit the signals by using two routes. In this description, the duplexed signal lines are referred to as "duplex signal lines".

As the signal line described above, there is known a so-called hard-wired signal line that transmits one signal by using one dedicated signal line. However, in the duplex signal lines described above, when the two routes are wired by hard-wired lines, for example, the number of signal lines increases by two if the number of signals from the external device increments by one. As described above, if the number of signals from the external device increases, the number of signal lines also increases. Along with this, the connectors and the terminal part that bundle the signal lines become larger and thus a space required for wiring increases. As a result, it is concerned that the robot system totally grows in size.

Therefore, the robot system 1 according to the first embodiment has been configured so that a duplex signal line 20 that connect the terminal part 10 and the robot control unit 11 includes two routes, which collectively transmit the plurality of signals by using signal lines, more specifically, first and second routes 20a and 20b. As a result, the number of signal lines that constitute the two routes 20a and 20b of the duplex signal line 20 can be decreased and thus the robot system 1 can be totally downsized.

In this description, the two routes 20a and 20b illustrated in FIG. 1 and the like are collectively expressed as the "signal line 20" or the "duplex signal line 20". Moreover, the similar expression is applied to other signal lines.

Returning to the explanation of FIG. 2, the case 13 has an internal space 14 in which the terminal part 10, the robot control unit 11, the robot monitoring unit 12, and the like can be housed. A partition wall 13a illustrated by a dotted line in FIG. 2 is formed inside the case 13. The internal space 14 is partitioned by the partition wall 13a into a plurality of areas (two areas, for example), more specifically, a first area 14a and a second area 14b.

The first area 14a is an area that an operator can simply access from the outside, for example, and is also an area in which an operation for connecting the external device 5 to the control board 4 can be easily performed. For example, the first area 14a is provided on the lower portion of the lateral surface or the bottom of the case 13. The terminal part 10 is placed in the first area 14a. As a result, the operator can simply access the terminal part 10, and thus can easily perform a connection operation for connecting the external device 5 to the terminal part 10.

On the other hand, the second area 14b is an area that the operator is hard to access, for example. For example, the second area 14b is an area that the operator cannot access if the partition wall 13a is not removed from the case 13. The robot control unit 11 and the robot monitoring unit 12 are arranged in the second area 14b. Because precision devices such as central processing units (CPU) are mounted on the robot control unit 11 and the robot monitoring unit 12 as described later, the precision devices can be protected from contact with the operator by arranging the robot control unit 11 and the like in the second area 14b.

The first area 14a may be provided on the backside of the case 13. Moreover, the internal space 14 may be approximately separated into the first area 14a and the second area 14b, or may not be necessarily separated by the partition wall 13a perfectly.

Returning to the explanation of FIG. 1, the emergency stop switch 5a is connected to the connection terminal 10a1 of the terminal part 10, more specifically, the input terminal via a signal line 21 (reference numbers 21a and 21b in FIG. 1). The emergency stop switch 5a is provided on, for example, an operating device (not illustrated) of the robot 2. When the switch is clicked by the operator, a signal (hereinafter, "robot stop signal") that indicates a stop reference of the robot 2 and a signal (hereinafter, "peripheral device stop signal") that indicates a stop reference of the peripheral device 3 are output to the terminal part 10.

The safety fence switch 5b is connected to the connection terminal 10a1 of the terminal part 10, more specifically, the input terminal via the signal line 21. Herein, the input terminal, to which the emergency stop switch 5a is connected, the input terminal, to which the safety fence switch 5b is connected, and the input terminal, to which the safety PLC 5c to be described later is connected, are separate input terminals. Moreover, the signal lines 21 are separate lines.

For example, a safety fence (not illustrated) is provided around the robot 2 so that a person does not enter a working area during the operation of the robot 2. If a person intrudes into the safety fence, the safety fence switch 5b detects the intrusion and outputs the robot stop signal and the peripheral device stop signal to the terminal part 10.

The safety PLC 5c is connected to the connection terminals 10a1 and 10a2, more specifically, the input and output terminals of the terminal part 10 via the signal line 21. As described later, the safety PLC 5c receives spatial position information of the robot 2 and spatial position information of the peripheral device 3 output from the output terminals, and detects the states (spatial position of the robot 2, for example) of the robot 2 and the peripheral device 3 on the basis of the received signals. Then, the safety PLC 5c displays the detected states of the robot 2 and the peripheral device 3 on a display unit (not illustrated) to report it to the operator.

The safety PLC 5c makes the operator set prescribed operating ranges and prescribed speeds of the robot 2 and the peripheral device 3 and outputs signals indicating the set prescribed operating ranges and prescribed speeds to the input terminal of the terminal part 10.

As described above, the external devices 5 are connected to the terminal part 10 of the control board 4, and thus the signals are input and output from the external devices 5 to the terminal part 10 or from the terminal part 10 to the external devices 5. The present embodiment has the configuration that the external devices 5 include the emergency stop switch 5a, the safety fence switch 5b, and the like. This is only an exemplification and thus this embodiment is not limited to this. In other words, the external device 5 may be, for example, a light curtain or a mat switch that outputs a robot stop signal and a peripheral device stop signal when a person invades into the peripheral area of the robot 2. As described above, the external device 5 described above is a means for outputting signals for monitoring the robot 2 and its vicinity.

The configuration of the robot system 1 described above will be explained in detail with reference to FIG. 3. FIG. 3 is a block diagram of the robot system 1 illustrated in FIG. 1. In FIG. 3, for simplification of the drawing, the connection terminals 10a1 and 10a2 are collected into one block and are referred to as a "connection terminal 10a". Moreover, the emergency stop switch 5a, the safety fence switch 5b, and the like are collected into one block and are referred to as the "external device 5".

As illustrated in FIG. 3, in the robot system 1, the external device 5 and the terminal part 10 of the control board 4 are connected to each other via the signal line 21 described above. Moreover, the terminal part 10 and the robot control unit 11 of the control board 4 are connected to each other via the signal line 20 described above, and the robot control unit 11 and the robot monitoring unit 12 are connected to each other via a signal line 22. Each of the signal lines 20 and 21 is duplexed. However, the configurations of the signal lines 20 and 21 are different.

More specifically, the terminal part 10 of the control board 4 includes the connection terminal 10a and a plurality of application specific integrated circuits (hereinafter, "ASIC") (specifically, two) 10b and 10c. The robot control unit 11 includes a plurality of ASICs (specifically, two) 11a and 11b for the terminal part 10, a plurality of CPUs (specifically, two) 11c and 11d, a shared RAM (random access memory) 11e, and an ASIC 11f for the robot monitoring unit 12. Moreover, the robot monitoring unit 12 includes an ASIC 12a, CPUs 12b and 12c, and a shared RAM 12d. In FIG. 3, the robot monitoring unit 12 has been configured to provide two CPUs to be duplexed in order to monitor whether the CPUs have anomaly with respect to each other. For example, to simplify the configuration, the robot monitoring unit 12 may include only one CPU.

The signal line 21 transmits the robot stop signal and the like from the external device 5 to the terminal part 10, and also transmits the spatial position information and the like of the robot 2 and the peripheral device 3 generated by the robot encoder signals from the terminal part 10 to the external device 5, via the two routes 21a and 21b. The two routes 21a and 21b are wired by hard-wired lines, for example. In other words, each of the routes 21a and 21b is wired by signal lines having the same number as the number of signals transmitted between the external device 5 and the terminal part 10.

As described above, the signal line 21 is not easily affected by noises because the two routes 21a and 21b are wired by hard-wired lines. Moreover, transmission of signals from the external device 5 to the terminal part 10 and transmission of signals from the terminal part 10 to the external device 5 can be surely performed by duplexing the signal line 21 even if one of the two routes 21a and 21b has a trouble such as breaking of wire.

Among the plurality of signals input from the external device 5 into the connection terminal 10a of the terminal part 10, a signal input via the one route 21a is output to the ASIC 10b and a signal input via the other route 21b is output to the ASIC 10c.

As described above, the duplex signal line 20 that connects the terminal part 10 and the robot control unit 11 transmits the plurality of signals input from the external device 5 into the terminal part 10 to the robot control unit 11 via two routes, for example. Particularly, the duplex signal line 20 includes two routes each of which collects the plurality of signals and transmits the signals with the signal line, more specifically, the first and second routes 20a and 20b. In the present embodiment, the signal line 20 for connecting the ASIC 10b of the terminal part 10 and the ASIC 11a of the robot control unit 11 is referred to as the first route 20a, and the signal line 20 for connecting the ASIC 10c of the terminal part 10 and the ASIC 11b of the robot control unit 11 is referred to as the second route 20b.

Specifically, each of the first and second routes 20a and 20b is wired by one serial communication line, for example. Particularly, the ASIC 10b, the ASIC 11a, the ASIC 10c, and the ASIC 11b have a function for collecting the plurality of signals as data and continuously outputting the data. A serial communication is established by connecting the ASICs with a serial communication line. As described above, the ASIC 10b and the ASIC 10c are a means for duplexing the plurality of signals and respectively outputting the signals as a serial signal.

The determination of whether signals are correctly transmitted in the first and second routes 20a and 20b is performed by comparing the signals transmitted from the routes 20a and 20b by using the CPUs 11c and 11d as described later. Therefore, serial communication of the first and second routes 20a and 20b does not employ, for example, a safety protocol (for example, cyclic redundancy check (CRC) or packet time stamp) by which data corruption can be detected. Transmission and reception of only a signal sent from the external device 5 to the terminal part 10 or only a signal sent from the terminal part 10 to the external device 5 are performed in the serial communication.

As described above, the robot system 1 according to the present embodiment has been configured so that the first and second routes 20a and 20b of the duplex signal line 20 are wired by serial communication lines. As a result, in comparison with the case where two routes are wired by hard-wired lines, because the number of signal lines can be decreased and the terminal part 10 and wiring space in the control board can be downsized, the robot system 1 can be totally downsized.

The duplex signal line 20 is wired inside the control board 4. Therefore, wiring saving can be performed inside the control board 4. For example, it is possible to improve workability when maintenance is performed on the control board 4.

Furthermore, because the number of the lines of the duplex signal line 20 is decreased, the occupied space of the duplex signal line 20 in the internal space of the control board 4 is decreased. As a result, it is possible to improve air permeability and heat exhaust efficiency in the control board 4.

Returning to the explanation of FIG. 3, in this way, the signal input into the ASIC 11a is output to the CPU 11c and the signal input into the ASIC 11b is output to the CPU 11d.

The CPUs 11c and 11d mutually perform status monitoring through the shared RAM 11e, and determine whether the signals are correctly transmitted from the terminal part 10 to the robot control unit 11. Specifically, the CPUs 11c and 11d compare the plurality of signals input into them and determine whether the signals are identical to each other.

As described above, the CPUs 11c and 11d that function as a determining unit that determines whether a signal is correctly transmitted from the terminal part 10 to the robot control unit 11 are provided in only the robot control unit 11, and the terminal part 10 does not include a device, for example CPU, that has the above function.

When connecting the external device 5, for example, a vibration and an excessive force are easy to act on the terminal part 10. When a precision device such as CPU is mounted on the terminal part 10, it is concerned that the CPU is affected by a vibration and thus breaks down. Therefore, because the robot system 1 according to the present embodiment has the configuration as described above, the precision device such as CPU does not break down due to vibrations accompanied with the connection operation of the external device 5 and thus reliability of the robot system 1 can be improved. Moreover, because the terminal part 10 does not include the precision device such as CPU, it is advantageous also on the cost front.

When it is determined that the signals input into the CPUs are not identical to each other, because it is concerned that one of the lines of the duplex signal line 20 has a trouble such as breaking of wire, for example, the CPUs 11c and 11d output, to a power supply control unit 30, a signal (hereinafter, "power shutdown signal") by which power supply to the robot 2 and the peripheral device 3 is blocked. The power supply control unit 30 includes one or more contactors, for example. When the power shutdown signal described above is input, the power supply control unit 30 blocks the power supply to the robot 2 and the peripheral device 3 to stop operations of them. As described above, operations of the robot 2 and the like can be surely stopped by blocking the power supply to the robot 2 and the like. Herein, the robot control unit 11 is a means for controlling an operation of the robot 2 in accordance with the serial signal.

When the robot stop signal or the peripheral device stop signal is included in the plurality of input signals, the CPUs 11c and 11d of the robot control unit 11 output the power shutdown signal to the power supply control unit 30 and stop operations of the robot 2 and the peripheral device 3. The operation of the CPUs 11c and 11d is an exemplification, and thus this embodiment is not limited to this. For example, only the operation of the robot 2 may be stopped when the robot stop signal is included in the plurality of input signals, and only the operation of the peripheral device 3 may be stopped when the peripheral device stop signal is included in the plurality of input signals.

The ASIC 11f of the robot control unit 11 is connected to the ASIC 12a of the robot monitoring unit 12 via the signal line 22. The signal line 22 is wired by one serial communication line, for example. Particularly, the ASIC 11f and the ASIC 12a have a function for collecting the plurality of signals as data and continuously outputting the data. Serial communication is established by connecting the ASICs with a serial communication line.

Because both of the robot control unit 11 and the robot monitoring unit 12 include CPUs in the serial communication between the ASIC 11f and the ASIC 12a, transmission and reception of data using a safety protocol can be performed.

In other words, because both of transmitting side and receiving side of data include CPU that can analyze the transmitted and received data, a safety protocol such as a cyclic redundancy check (CRC) and a packet time stamp can be utilized. By using the safety protocol as described above, the signal line 22 can be configured by one serial communication line, and the CPUs 11c and 11d and the CPU 12b can easily determine whether signals are correctly transmitted, namely, whether signals have anomaly.

Because the robot system 1 according to the present embodiment has been configured so that the signal line 22 is wired by one serial communication line, the number of signal lines can be decreased in comparison with the case where the signal line 22 is wired by a hard-wired line, and thus the robot system 1 can be more downsized totally. Herein, it has been explained that the number of serial communication lines of the signal line 22 and the number of serial communication lines of the first and second routes 20a and 20b of the signal line 20 are one. However, the number of lines is not limited to this. The number of lines may be two or more.

The signal transmitted via the signal line 22 will be explained. For example, a signal that indicates a prescribed operating range and a prescribed speed is input from the safety PLC 5c of the external device 5 into the robot monitoring unit 12 via the signal line 21, the terminal part 10, the signal line 20, the robot control unit 11, and the signal line 22. Moreover, the robot encoder signals and the peripheral device encoder signals are input into the robot monitoring unit 12 from the encoders 2c and 3b.

The robot monitoring unit 12 monitors operating states of the robot 2 and the peripheral device 3. More specifically, the CPU 12b of the robot monitoring unit 12 detects operating states of the robot 2 and the peripheral device 3 on the basis of the input encoder signals. When the detected operating state deviates from the prescribed operating range or the prescribed speed, the CPU 12b outputs the robot stop signal and the peripheral device stop signal to the robot control unit 11 via the signal line 22. Similarly to the above, the robot control unit 11 stops operations of the robot 2 and the like in accordance with the input robot stop signal and the like.

The robot monitoring unit 12 outputs spatial position information computed from the input robot encoder signals and peripheral device encoder signals to the safety PLC 5c via the signal line 22, the robot control unit 11, the signal line 20, the terminal part 10, and the signal line 21.

The spatial position information will be explained. Because the length and shape of each of the arms 2a for connecting the joints of the robot 2 are well known, the positions of each the arm 2a and the leading-end hand 2b of the robot 2 can be calculated by forward kinematics if robot encoder signals are recognized. Moreover, in case of the peripheral device 3, the position of the workpiece W can be similarly calculated by forward kinematics if the shape of a moving unit such as the table 3a is well-known and the peripheral device encoder signals are known.

On the other hand, an operating space of the robot 2 and the peripheral device 3 is equally divided into rectangular solids virtually, and indices such as numbers are assigned to the rectangular solids to be able to identify them. By employing such the configuration, the index of the rectangular solid in which the arm 2a or the hand 2b exists presently can be computed from the robot encoder signals. Similarly, the index of the rectangular solid in which the workpiece W exists presently can be computed from the peripheral device encoder signals.

Information that indicates the rectangular solid in which the arm 2a or the hand 2b exists is referred to as spatial position information of the robot 2 in the present embodiment. Moreover, in case of the peripheral device 3, information that indicates the rectangular solid in which the moving unit or the workpiece W exists is referred to as spatial position information of the peripheral device 3.

Furthermore, information that indicates that "a device exists other than the robot 2 and the peripheral device 3" and information that indicates that "a distance between them and the coming and going area of the operator is short" can be added to the rectangular solids. By employing such the configuration, it is possible to perform a sequence process for comparing spatial position information and information added to the rectangular solids by the safety PLC 5c and for reducing operating speeds of the robot 2 and the peripheral device 3 or suspending the operations if needed.

As described above, each of the duplexed signal lines 20 and 21 is configured to transmit signals bidirectionally. For example, the duplex signal line 20 is configured to transmit, to the robot control unit 11, a signal (robot stop signal, for example) input into the input terminal of the terminal part 10 from the external device 5, and to transmit a signal (spatial position information of the robot 2 and the peripheral device 3 generated by the robot encoder signals and the like) from the robot control unit 11 to the output terminal of the terminal part 10. As a result, the duplex signal line 20 can be used, for example, for not only transmission of the signal from the external device 5 to the robot control unit 11 but also transmission of the signal from the robot control unit 11 to the external device 5.

Figure 4:
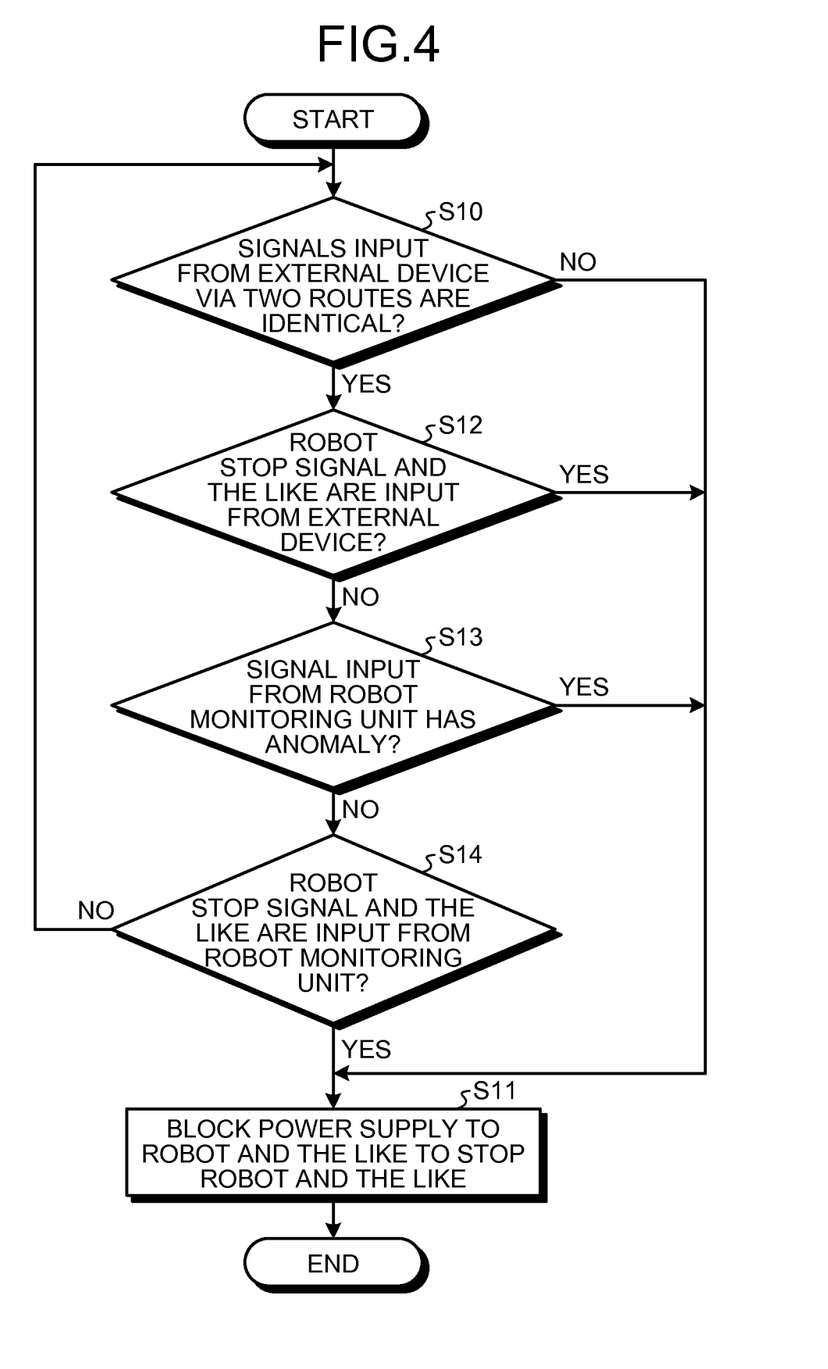
FIG. 4 is a flowchart illustrating the routine that is performed by a robot control unit illustrated in FIGS. 2 and 6.

FIG. 4 is a flowchart illustrating the routine that is performed by the robot control unit 11. As illustrated in FIG. 4, the robot control unit 11 determines whether signals from the external device 5 are correctly transmitted via the signal line 21, the terminal part 10, and the signal line 20. Specifically, the robot control unit 11 compares the signal input from the external device 5 via the first route 20a with the signal input from the external device 5 via the second route 20b of the duplex signal line 20, and determines whether these signals are identical to each other (Step S10).

Because it is concerned that the duplex signal line 20 has a trouble such as breaking of wire when the signals from the two routes 20a and 20b are not identical to each other (Step S10: No), the robot control unit 11 outputs the power shutdown signal to the power supply control unit 30 and blocks power supply to the robot 2 and the like to stop operations of the robot 2 and the like (Step S11).

On the other hand, when the signals from the two routes 20a and 20b are identical to each other (Step S10: Yes), the robot control unit 11 determines whether the robot stop signal and/or the peripheral device stop signal are input from the external device 5 (Step S12).

When the robot stop signal and the like are input (Step S12: Yes), the robot control unit 11 outputs the power shutdown signal to stop operations of the robot 2 and the peripheral device 3 as described above (Step S11). On the other hand, when the robot stop signal and the like are not input (Step S12: No), the robot control unit 11 determines whether the signal input from the robot monitoring unit 12 has anomaly such as data corruption (Step S13).

When the signal from the robot monitoring unit 12 does not have anomaly (Step S13: No), the robot control unit 11 determines whether the robot stop signal and/or the peripheral device stop signal are input from the robot monitoring unit 12 (Step S14).

When the robot stop signal and the like are input from the robot monitoring unit 12 (Step S14: Yes) or when the signal from the robot monitoring unit 12 has anomaly (Step S13: Yes), the robot control unit 11 outputs the power shutdown signal to stop operations of the robot 2 and the peripheral device 3 as described above (Step S11). On the other hand, when the robot stop signal and the like are not input from the robot monitoring unit 12 (Step S14: No), the robot control unit 11 returns the control to Step S10 to repeat the processes.

As described above, the robot system 1 according to the first embodiment has been configured so that the duplex signal line 20 includes the two routes 20a and 20b for collecting the plurality of signals and transmitting the signals with signal lines. As a result, the number of signal lines that constitute the two routes 20a and 20b of the duplex signal line 20 can be decreased, and thus the robot system 1 can be totally downsized.

Next, a second embodiment will be explained.

Figure 5:
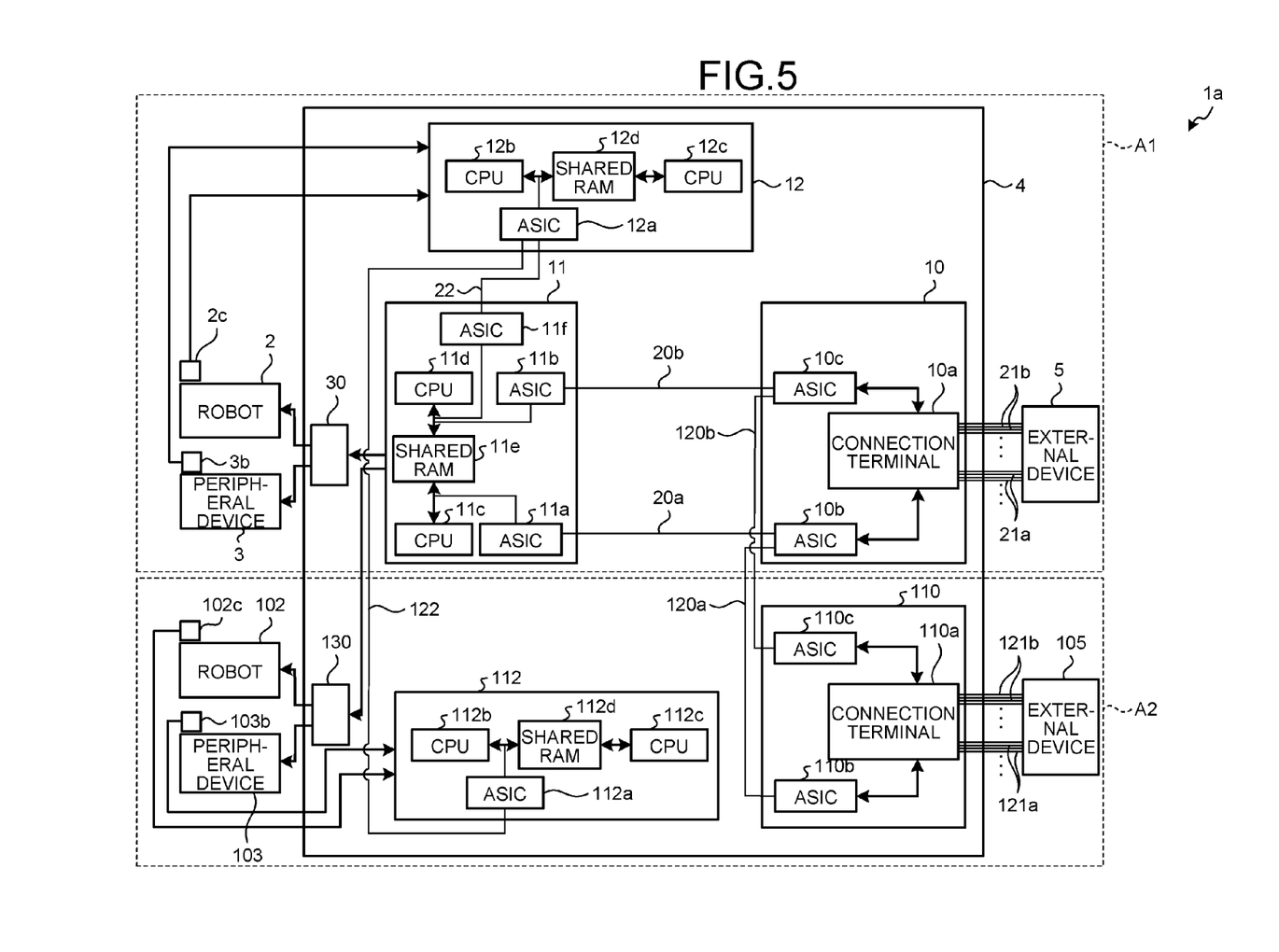
FIG. 5 is a block diagram illustrating the configuration of a robot system according to a second embodiment.
Figure 6:
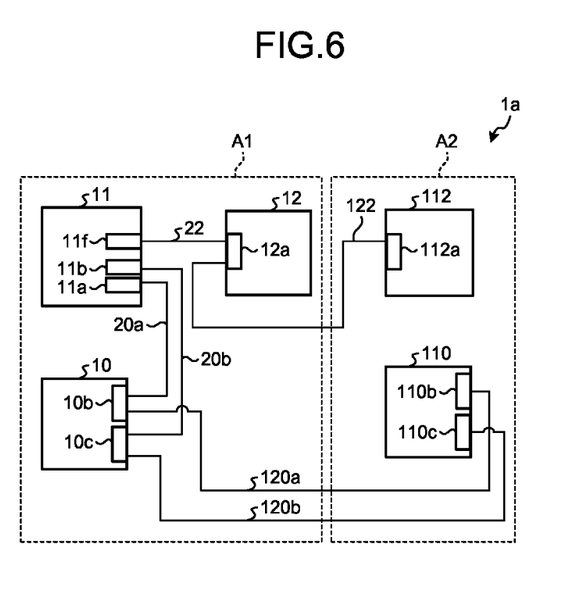
FIG. 6 is a diagram explaining connection between terminal parts in the robot system illustrated in FIG. 5.

FIG. 5 is a block diagram, similar to that of FIG. 3, illustrating a robot system 1a according to the second embodiment. FIG. 6 is a diagram explaining connection between terminal parts of the robot system 1a illustrated in FIG. 5. As illustrated in FIG. 5, the robot system 1a according to the second embodiment includes a plurality of robots, more specifically, two robots of the first robot 2 and a second robot 102.

Because the respective numbers of peripheral devices, external devices, terminal parts, robot monitoring units, and power supply control units correspond to the number of robots, the respective numbers in the robot system 1a are plural, more specifically, two. In FIGS. 5 and 6, a section surrounded by a dotted line A1 includes a terminal part and the like that correspond to the first robot 2, and a section surrounded by a dotted line A2 includes a terminal part and the like that correspond to the second robot 102.

As will be appreciated from FIG. 5, because the configuration of the first robot 2 and the configurations of the first peripheral device 3, the first external device 5, the first terminal part 10, the robot control unit 11, the first robot monitoring unit 12, and the first power supply control unit 30 that correspond to the first robot 2 are substantially the same as those of the first embodiment, the same reference numbers are given and their descriptions are omitted.

Moreover, the configuration of the second robot 102 and the configurations of a second peripheral device 103, a second external device 105, a second terminal part 110, a second robot monitoring unit 112, and a second power supply control unit 130 that correspond to the second robot 102 are substantially the same as those of the first embodiment. Therefore, in FIG. 5, reference numbers obtained by adding 100 to the reference numbers of the elements of the first embodiment are given to the elements of the second robot 102 and the like, and their descriptions are omitted. Moreover, because the robot control unit 11 can control operations of the robots 2 and 102 and the peripheral devices 3 and 103, the robot system 1*a* according to the present embodiment includes only one robot control unit.

To simplify illustration in FIG. 6, the first and second robots 2 and 102, the first and second peripheral devices 3 and 103, and the first and second power supply control units 30 and 130 are not illustrated.

To explain on the robot system 1*a* according to the second embodiment on the basis of the above, as illustrated in FIGS. 5 and 6, the first and second terminal parts 10 and 110 are serially connected via a duplex signal line 120 (reference numbers 120*a* and 120*b* in the diagram). As a result, even if the number of terminal parts is plural, the terminal parts 10 and 110 can be easily connected.

The duplex signal line 120 includes two routes, more specifically, the first and second routes 120*a* and 120*b* each of which collects the plurality of signals input into one terminal part (for example, the second terminal part 110) and transmits the signals to the other terminal part (for example, the first terminal part 10) with the signal line.

Particularly, the signal line 120 for connecting an ASIC 110*b* of the second terminal part 110 to the ASIC 10*b* of the first terminal part 10 is referred to as the first route 120*a* and is wired by a serial communication line. The signal line 120 for connecting an ASIC 110*c* of the second terminal part 110 and the ASIC 10*c* of the first terminal part 10 is referred to as the second route 120*b* and is wired by a serial communication line. Moreover, although it is not illustrated, a termination process is appropriately performed on these serial communication lines by attaching termination registers and the like, for example.

As a result, the signal from the second external device 105 is input into the robot control unit 11 via a signal line 121 (reference numbers 121*a* and 121*b* in the diagram), the second terminal part 110, the signal line 120, the first terminal part 10, and the signal line 20. Herein, because the first routes 20*a* and 120*a* and the second routes 20*b* and 120*b* of the signal lines 20 and 120 perform serial communication (data communication), the robot control unit 11 can easily determine whether the input signal is input from the first external device 5 or from the second external device 105.

As described above, the robot system 1*a* according to the present embodiment has been configured so that the two routes 120*a* and 120*b* of the duplex signal line 120 are wired by serial communication lines. As a result, because the number of signal lines can be decreased in comparison with the case where the two routes are wired by hard-wired lines and thus the terminal parts 10 and 110 can be downsized, the robot system 1*a* can be consequently downsized totally.

The first robot monitoring unit 12 and the second robot monitoring unit 112 are serially connected via a signal line 122. The signal line 122 is wired by one serial communication line, for example. As a result, the signal from the second robot monitoring unit 112 is input into the robot control unit 11 via the signal line 122, the first robot monitoring unit 12, and the signal line 22. Although it is not illustrated, a termination process is appropriately performed on the serial communication line by attaching termination registers and the like, for example.

Because serial communication (data communication) is performed on the signal lines 22 and 122, the robot control unit 11 can easily determine whether the input signal is input from the first robot monitoring unit 12 or from the second robot monitoring unit 112.

As described above, because the robot system 1*a* has been configured so that the signal line 122 is wired by one serial communication line, the number of signal lines can be decreased in comparison with the case where the signal line 122 is wired by a hard-wired line, and thus the robot system 1*a* can be more downsized totally.

Next, operations of the robot control unit 11 will be explained. Because the operations of the robot control unit 11 are basically the same as those of the first embodiment, their explanations are performed with reference to FIG. 4. The robot control unit 11 compares signals input from the first and second external devices 5 and 105 via the two routes 20*a* and 20*b* of the signal line 20, and determines whether the signals are identical to each other (Step S10).

When the signals from the two routes 20*a* and 20*b* are not identical to each other (Step S10: No), the robot control unit 11 outputs the power shutdown signal to the first and second power supply control units 30 and 130 to stop all the operations of the first and second robots 2 and 102 and the first and second peripheral devices 3 and 103 (Step S11).

On the other hand, when the signals from the two routes 20*a* and 20*b* are identical to each other (Step S10: Yes), the robot control unit 11 determines whether the robot stop signal and/or the peripheral device stop signal are input from at least one of the first and second external devices 5 and 105 (Step S12).

When the robot stop signal and the like are input from at least one of the first and second external devices 5 and 105 (Step S12: Yes), the robot control unit 11 outputs the power shutdown signal to stop all the operations of the first and second robots 2 and 102 and the like (Step S11). As a result, it is possible to improve surrounding safety of the first and second robots 2 and 102 and like.

On the other hand, when the robot stop signal and the like are not input from the first and second external devices 5 and 105 (Step S12: No), the robot control unit 11 determines whether signals input from the first and second robot monitoring units 12 and 112 have anomaly (Step S13).

When the signals from the first and second robot monitoring units 12 and 112 do not have anomaly (Step S13: No), the robot control unit 11 determines whether the robot stop signal and/or the peripheral device stop signal are input from at least one of the first and second robot monitoring units 12 and 112 (Step S14).

When the robot stop signal and the like are input from at least one of the first and second robot monitoring units 12 and 112 (Step S14: Yes) or when the signals from the first and second robot monitoring units 12 and 112 have anomaly (Step S13: Yes), the robot control unit 11 executes the process of Step S11.

On the other hand, when the robot stop signal and the like are not input from the first and second robot monitoring units 12 and 112 (Step S14: No), the robot control unit 11 returns the control to Step S10 to repeat the processes. Although it is configured that all the operations of the first and second robots 2 and 102 and the like are stopped in the process of Step S11, this embodiment is not limited to this. In other words, at Step S11, only the robot that corresponds to the input robot stop signal may be stopped, or only the peripheral device that corresponds to the input peripheral device stop signal may be stopped, for example.

As described above, the second embodiment has the configuration that the first and second terminal parts 10 and 110 that correspond to the first and second robots 2 and 102 are serially connected via the duplex signal line 120 and the two routes 120*a* and 120*b* of the duplex signal line 120 are wired by serial communication lines. As a result, the number of lines of the signal line 120 for connecting the first and second terminal parts 10 and 110 can be decreased and thus the robot system 1a can be totally downsized. In this case, because the other effects are the same as those of the first embodiment, their descriptions are omitted.

The second embodiment has the configuration that the respective numbers of the robots 2 and 102, the external devices 5 and 105, the terminal parts 10 and 110, and the like are two. However, the embodiment is not limited to this. The number may be three or more.

Moreover, the embodiments have the configuration that the terminal part 10, the robot control unit 11, and the robot monitoring unit 12 are housed inside the control board 4. However, the embodiments are not limited to this. For example, the embodiments may have a configuration that the terminal part 10 is located away from the control board 4 to make an operator perform a work operation for connecting the external device 5 to the terminal part 10 at the located place.

Moreover, the embodiments have the configuration that the routes for collecting the plurality of signals and transmitting the signals with signal lines employ serial communication lines. However, wireless communication such as short-distance wireless communication and infrared communication such as Bluetooth (registered trademark) may be employed. Moreover, the communication method is not limited to serial communication. The communication method may be another communication method such as parallel communication. Herein, the number of signal lines when the communication method is parallel communication may be larger than the number of signal lines when the communication method is serial communication. However, parallel communication can decrease the number of signal lines as compared to the hard-wired method, and thus the miniaturization of the robot systems 1 and 1a can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
    a terminal part that includes a plurality of first connection terminals to which one or more external devices that output a plurality of signals can be connected respectively, and a plurality of second connection terminals to which the external device(s) that output the plurality of signals can be connected respectively;
    a robot control unit that controls an operation of a robot in accordance with the signals from the external device(s);
    a first signal line via which the terminal part and the robot control unit are connected to each other to collect and transmit the plurality of signals, input from the external device(s) into the first connection terminals, to the robot control unit; and
    a second signal line, different from the first signal line, via which the terminal part and the robot control unit are connected to each other to collect and transmit the plurality of signals, input from the external device(s) into the second connection terminals, to the robot control unit, wherein
    the robot control unit and the terminal part are housed in a control board, and
    the first signal line and the second signal line via which the terminal part and the robot control unit are connected to each other are wired inside the control board.

2. The robot system according to claim 1, wherein the robot control unit includes a determining, unit that determines whether the signals are correctly transmitted from the terminal part to the robot control unit.

3. The robot system according to claim 2, wherein each of the first signal line and the second signal line includes a serial communication line.

4. The robot system according to claim 1, wherein each of the first signal line and the second signal line includes a serial communication line.

5. The robot system according to claim 1, further comprising:
    one or more robots; and
    one or more terminal parts that correspond to the robots and each of which includes a connection terminal to which one or more external devices that output a plurality of signals can be connected, wherein
    the terminal parts are serially connected via a duplex signal line.

6. The robot system according to claim 2, further comprising:
    one or more robots; and
    one or more terminal parts that correspond to the robots and each of which includes a connection terminal to which one or more external devices that output a plurality of signals can be connected, wherein
    the terminal parts are serially connected via a duplex signal line.

7. The robot system according to claim 5, wherein the first signal line and the second signal line, via which the terminal parts are connected to each other, include two routes each of which collects the plurality of signals input into the one terminal part and transmits the signals to the other terminal part.

8. The robot system according to claim 6, wherein the first signal line and the second signal line, via which the terminal parts are connected to each other, include two routes each of which collects the plurality of signals input into the one terminal part and transmits the signals to the other terminal part.

9. The robot system according to claim 1, wherein
    the connection terminal includes an input terminal that inputs the signal from the external device(s) and an output terminal that outputs a signal to the external device(s), and
    the first signal line and the second signal line, via which the terminal part and the robot control unit are connected to each other, transmit the signal input into the input terminal to the robot control unit and transmit the signal from the robot control unit to the output terminal.

10. The robot system according to claim 2, wherein
    the connection terminal includes an input terminal that inputs the signal from the external device(s) and an output terminal that outputs a signal to the external device(s), and
    the first signal line and the second signal line, via which the terminal part and the robot control unit are connected to each other, transmit the signal input into the input terminal to the robot control unit and transmit the signal from the robot control unit to the output terminal.

11. The robot system according to claim 1,
    wherein, when a signal that indicates a stop reference of the robot is input from the external device(s), the robot control unit blocks power supply to the robot to stop the operation of the robot, and wherein, when an anomaly is determined in a signal input to the robot control unit, the robot control unit blocks power supply to the robot to stop the operation of the robot.

12. The robot system according to claim 1, further comprising a robot monitoring unit that outputs position information of the robot to the robot control unit, wherein, when a signal that indicates a stop reference of the robot is input from the external device(s), the robot control unit blocks power supply to the robot to stop the operation of the robot, and wherein, when an anomaly is determined in a signal from the robot monitoring unit, the robot control unit blocks power supply to the robot to stop the operation of the robot.

13. The robot system according to claim 1, further comprising one or more robots, wherein when a signal that indicates a stop reference of the robots is input from the external device(s), the robot control unit stops all the operations of the robots, and when an anomaly is determined in a signal input to the robot control unit, the robot control unit stops all operations of the robot.

14. The robot system according to claim 1, further comprising:

one or more robots; and a robot monitoring unit that outputs position information of the robot to the robot control unit, wherein, when a signal that indicates a stop reference of the robots is input from the external device(s), the robot control unit stops all the operations of the robots, and wherein, when an anomaly is determined in a signal from the robot monitoring unit, the robot control unit blocks power supply to the robot to stop the operation of the robot.

15. A robot system comprising:

a terminal part that includes a plurality of first connection terminals to which one or more external devices that output a plurality of signals can be connected respectively, and a plurality of second connection terminals to which the external device(s) that output the plurality of signals can be connected respectively;

a robot control unit that controls an operation of a robot in accordance with the signals from the external device(s);

a first signal line via which the terminal part and the robot control unit are connected to each other to collect and transmit the plurality of signals, input from the external device(s) into the first connection terminals, to the robot control unit; and a second signal line, different from the first signal line, via which the terminal part and the robot control unit are connected to each other to collect and transmit the plurality of signals, input from the external device(s) into the second connection terminals, to the robot control unit, wherein the terminal part includes:

a first circuit that collects and outputs the plurality of signals received via the plurality of first connection terminals to the first signal line; and a second circuit that collects and outputs the plurality of signals received via the plurality of second connection terminals to the second signal line.

16. A robot system comprising:

a first terminal part that includes a connection terminal to which one or more first external devices that output a plurality of first signals can be connected;

a second terminal part that includes a connection terminal to which one or more second external devices that output a plurality of second signals can be connected;

a robot control unit that controls an operation of a first robot in accordance with the first signals from the first external device(s) and controls an operation of a second robot in accordance with the second signals from the second external device(s);

a first signal line via which the first terminal part and the second terminal part are connected to each other to collect and transmit the plurality of second signals, input from the second external device(s) into the second terminal part, to the first terminal part;

a second signal line, different from the first signal line, via which the first terminal part and the second terminal part are connected to each other to collect and transmit the plurality of second signals, input from the second external device(s) into the second terminal part, to the first terminal part; and a third signal line via which the first terminal part and the robot control unit are connected to each other to collect and transmit the plurality of second signals, input from the first signal line into the second terminal part, and the plurality of first signals, input from the first external device(s) into the first terminal part, to the robot control unit; and a fourth signal line, different from the third signal line, via which the first terminal part and the robot control unit are connected to each other to collect and transmit the plurality of second signals, input from the second signal line into the second terminal part, and the plurality of first signals, input from the first external device(s) into the first terminal part, to the robot control unit.

* * * * *